(12) United States Patent
Kelly et al.

(10) Patent No.: US 11,133,635 B2
(45) Date of Patent: Sep. 28, 2021

(54) SYSTEM AND METHOD FOR MULTI-STAGE CRIMPING AND STRIPPING (71) Applicant: DANIELS MANUFACTURING CORPORATION, Orlando, FL (US)

(72) Inventors: William D. Kelly, Orlando, FL (US); Aron Bacs, Jr., Orlando, FL (US)

(73) Assignee: DANIELS MANUFACTURING CORPORATION, Orlando, FL (US)

( * ) Notice: Subject to any disclaimer, the term of this patent is extended or adjusted under 35 U.S.C. 154(b) by 323 days.

(21) Appl. No.: 16/417,998

(22) Filed: May 21, 2019

(65) Prior Publication Data
US 2019/0356102 A1 Nov. 21, 2019

Related U.S. Application Data (60) Provisional application No. 62/674,277, filed on May 21, 2018.

(51) Int. Cl.
*H01R 43/058* (2006.01)
*H01R 43/042* (2006.01)
(Continued)

(52) U.S. Cl.
CPC ......... *H01R 43/058* (2013.01); *H01R 43/042* (2013.01); *H01R 43/05* (2013.01);
(Continued)

(58) Field of Classification Search
CPC .. H01R 43/04; H01R 43/042; H01R 43/0421; H01R 43/0424; H01R 43/048; H01R 43/05; H01R 43/058; H01R 43/0585; H02G 1/12; H02G 1/1202; H02G 1/1204; H02G 1/1207; H02G 1/1209; H02G 1/1212; H02G 1/1214; H02G 1/1217; H02G 1/1219; H02G 1/1229; H02G 1/1234; H02G 1/1248;
(Continued)

(56) References Cited

U.S. PATENT DOCUMENTS 2,738,693 A   3/1956  Logan
6,286,358 B1  9/2001  Beetz et al.
(Continued)

FOREIGN PATENT DOCUMENTS

DE   19906831   9/2000
EP   2493035    8/2012

*Primary Examiner* — Peter Dungba Vo
*Assistant Examiner* — Joshua D Anderson
(74) *Attorney, Agent, or Firm* — Matthew G. McKinney, Esq.; Allen, Dyer et al.

(57) ABSTRACT

A system for multi-stage crimping of a contact to a wire includes a first crimping die having a first portion of a selected shape defined therein, and a second crimping die having a complementary second portion of the selected shape defined therein. The system also includes the first and second crimping dies being operable to be displaced towards each other and along a first axis during a compression stroke. The first and second crimping dies are also operable to be displaced along a second axis during a closing stroke subsequent to the compression stroke, where the second axis is generally perpendicular to the first axis. In addition, the system includes the first and second crimping dies cooperating to crimp the contact into the selected shape to the wire upon completion of the closing stroke.

20 Claims, 13 Drawing Sheets (51) Int. Cl.
*H01R 43/05* (2006.01)
*H02G 1/12* (2006.01)

(52) U.S. Cl.
CPC ....... *H02G 1/1236* (2013.01); *H01R 43/0421* (2013.01); *H02G 1/1209* (2013.01); *Y10T 29/49185* (2015.01); *Y10T 29/49192* (2015.01); *Y10T 29/53222* (2015.01); *Y10T 29/53226* (2015.01); *Y10T 29/53235* (2015.01); *Y10T 29/53257* (2015.01)

(58) Field of Classification Search
CPC .. H02G 1/1251; H02G 1/1253; H02G 1/1256; H02G 1/1258; H02G 1/126; H02G 1/1263; Y10T 29/49181; Y10T 29/49183; Y10T 29/49185; Y10T 29/49192; Y10T 29/53213; Y10T 29/53222; Y10T 29/53226; Y10T 29/53235; Y10T 29/53257; Y10T 29/5327
See application file for complete search history.

(56) References Cited

U.S. PATENT DOCUMENTS

| | | | |
|---|---|---|---|
| 7,484,294 B2 | 2/2009 | De Keyser et al. | |
| 2007/0155235 A1* | 7/2007 | De Keyser | H01R 4/20 |
| | | | 439/585 |
| 2007/0271990 A1 | 11/2007 | Young | |
| 2009/0308129 A1* | 12/2009 | Young | B25B 27/146 |
| | | | 72/370.12 |
| 2009/0315419 A1 | 12/2009 | Mita et al. | |
| 2012/0192614 A1 | 8/2012 | Battenfield | |

\* cited by examiner

SYSTEM AND METHOD FOR MULTI-STAGE CRIMPING AND STRIPPING

CROSS-REFERENCE TO RELATED APPLICATIONS

This application claims priority to U.S. Provisional Application Ser. No. 62/674,277 filed on May 21, 2018 the contents of which are herein incorporated by reference in their entirety.

TECHNICAL FIELD

The present invention relates to the field of crimping tools, and, more particularly, to a system and method for multi-stage crimping and wire stripping.

BACKGROUND

Prior art crimp tools are known to crimp contacts to a wire. Contacts as used herein are defined as the termination points in electrical/electronic interconnect systems. When a complex wire harness is constructed, hundreds, perhaps thousands, of contacts are terminated by individually crimping a prepared wire into the contact wire barrel. Each wire may also have several conductors and be insulated.

Typically, a portion of the contact is crimped on to the insulation of the wire and another portion of the contact onto the exposed conductors of the wire. The crimping tool may have a several movable parts that are forced into engagement with the contact from at least four different directions, normally four or more.

Crimping the contact against the insulation is required in order to form an environmental seal between the contact and the insulation on the wire.

Figure 1A:
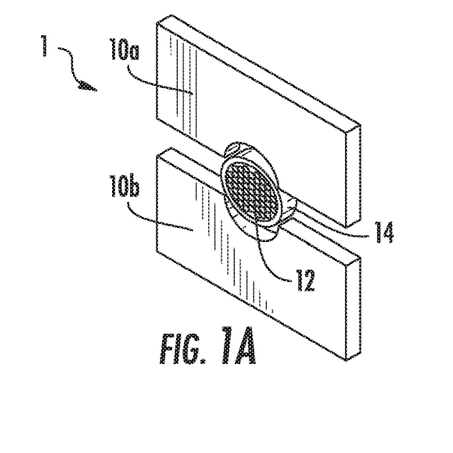
FIG. 1A is a perspective view of a circular crimping tool in an open position.
Figure 1B:
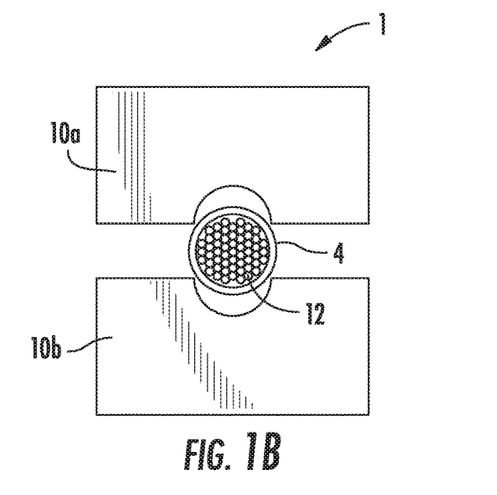
FIG. 1B is a front view of the circular crimping tool of FIG. 1A.
Figure 1C:
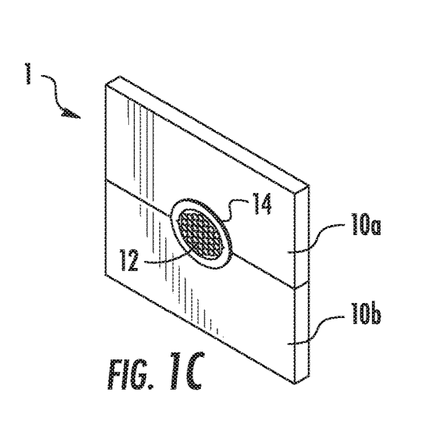
FIG. 1C is a perspective view of the circular crimping tool in a closed position.
Figure 1D:
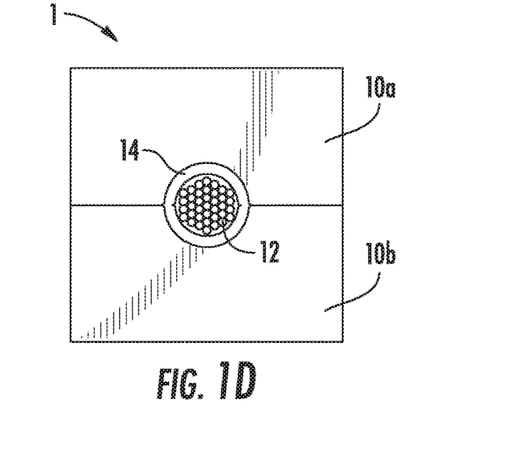
FIG. 1D is a front view of the circular crimping tool of FIG. 1C.

An example of an existing crimping tool 1 is shown in FIGS. 1A-1E for a circular crimp. In this particular type of crimping tool 1, there is a top die 10a, and a second die 10b. The wire 12 and contact 14 are placed between the first and second dies 10a, 10b as shown in FIGS. 1A and 1B. The first and second dies 10a, 10b are then moved together in a single motion to crimp the contact 14 to the wire 12 as shown in FIGS. 1C and 1D.

Figure 1E:
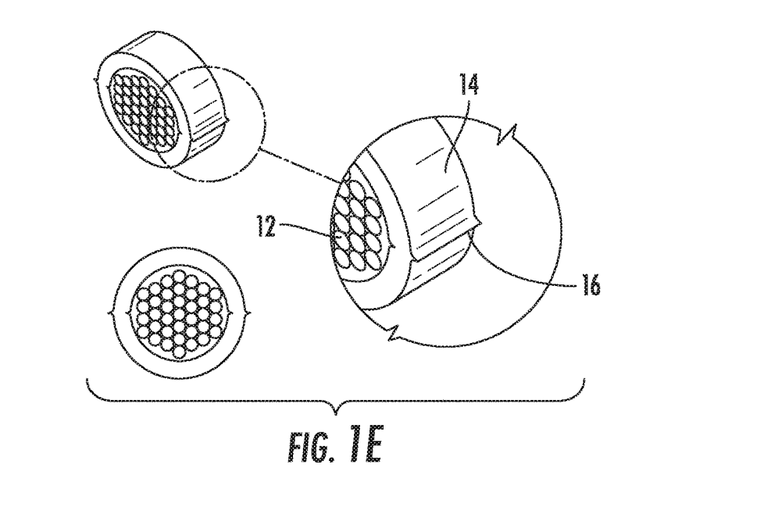
FIG. 1E is a detail view of a resulting crimp of the circular crimping tool.

However, the prior art crimping tool leaves behind a defect 16 in the contact 14 after it is crimped as illustrated in FIG. 1E. The defect 16 is a sharp edge formed by the pinching together of the contact 14 by the first and second dies 10a, 10b. The defect 16 can rub against other adjacent wires in a wiring harness and cause damage.

Figure 2A:
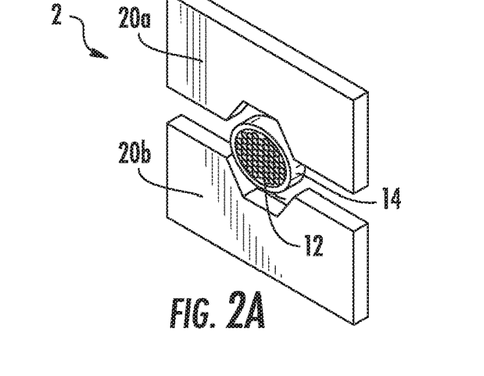
FIG. 2A is a perspective view of a hexagonal crimping tool in an open position.
Figure 2B:
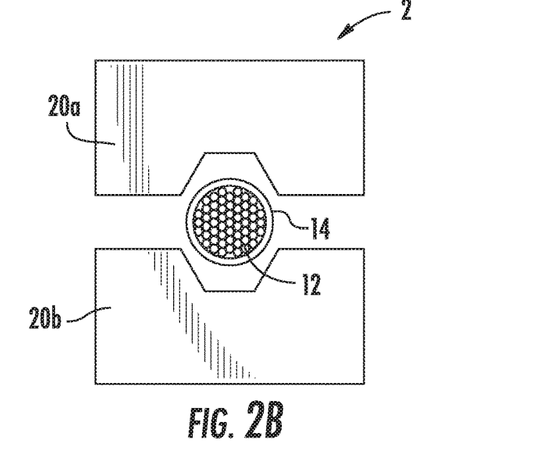
FIG. 2B is a front view of the hexagonal crimping tool of FIG. 2A.

Another example of a prior art crimping tool 2 is shown in FIGS. 2A-2E for a hexagonal crimp. Similar to the circular crimp discussed above, there are a first and second dies 20a, 20b, but have a hexagonal shape, and the wire 12 and contact 14 is placed between them as shown in FIGS. 2A and 2B.

Figure 2C:
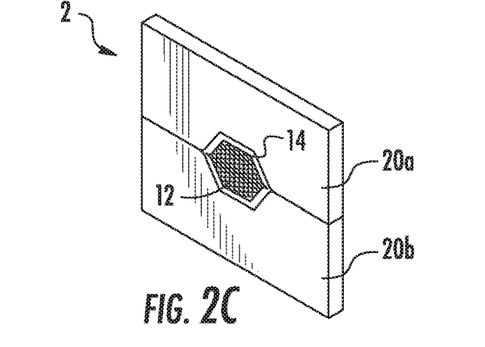
FIG. 2C is a perspective view of the hexagonal crimping tool in a closed position.
Figure 2D:
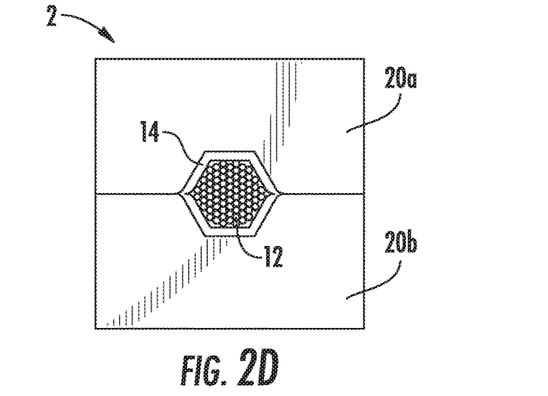
FIG. 2D is a front view of the hexagonal crimping tool of FIG. 2C.
Figure 2E:
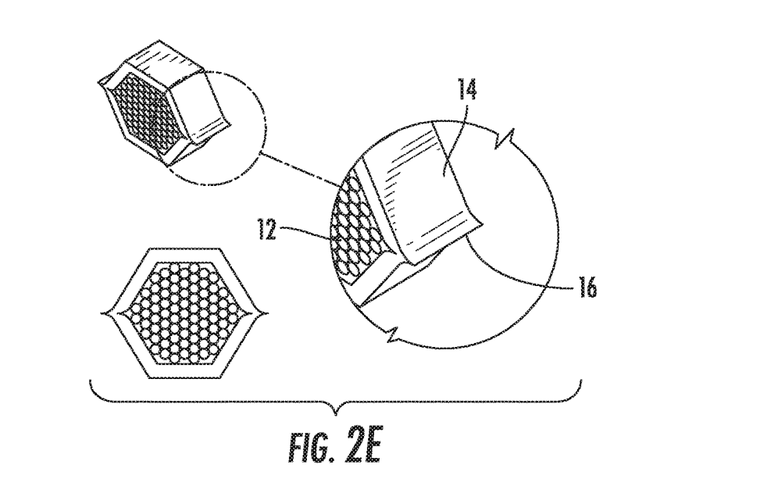
FIG. 2E is a detail view of a resulting crimp of the hexagonal crimping tool.

The first and second dies 20a, 20b are then moved together in a singular motion to crimp the contact 14 to the wire 12 as shown in FIGS. 2C and 2D. Also similar to the defect 16 discussed above, the hexagonal crimp also leaves a defect 16 as shown in FIG. 2E and results in a similar defect 16 no matter the shape of the crimp.

Figure 3A:
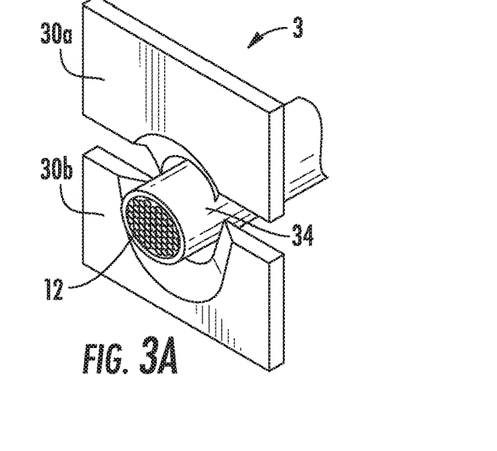
FIG. 3A is a perspective view of a wire stripping tool in an open position.
Figure 3B:
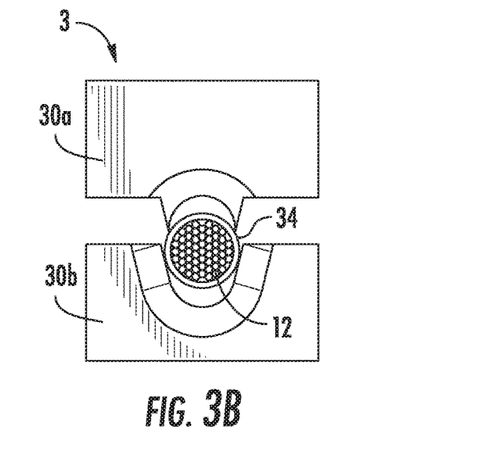
FIG. 3B is a front view of the wire stripping tool of FIG. 3A.
Figure 3C:
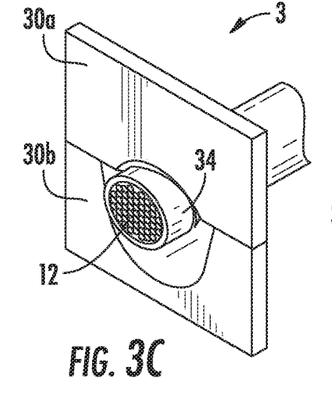
FIG. 3C is a perspective view of the wire stripping tool in a closed position.
Figure 3D:
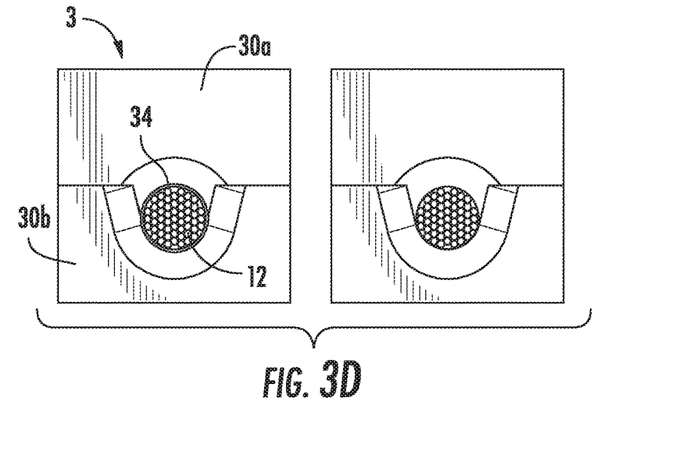
FIG. 3D is a front view of the wire stripping tool of FIG. 3C.
Figure 3E:
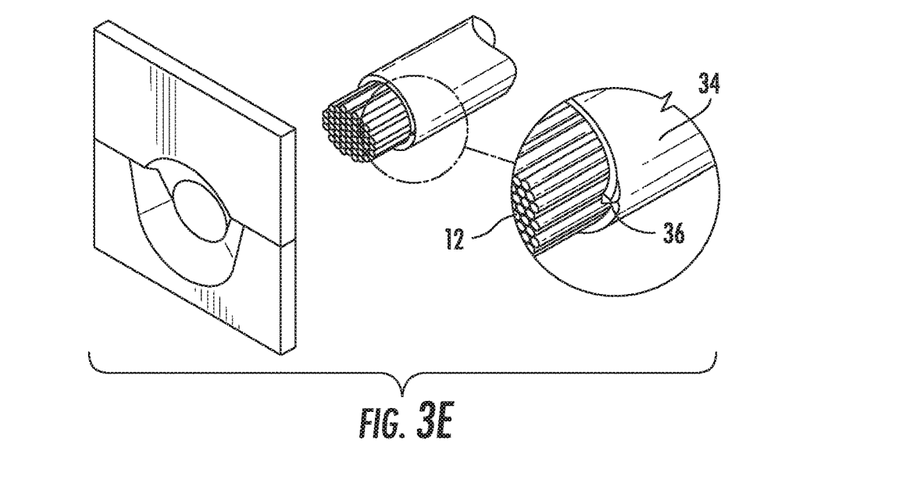
FIG. 3E is a detail view of a resulting wire after insulation being stripped.

Another shortcoming of the prior art crimping and wiring stripping tools is illustrated in FIGS. 3A-3E. Here, the wire stripping tool 3 has a first blade 30a and a second blade 30b with sharpened edges, where the wire 12 having insulation 34 is placed therebetween as shown in FIGS. 3A and 3B. The first and second blades 30a, 30b are then moved towards each other in a single motion to cut through the insulation 34 as shown in FIGS. 3C and 3D. A jagged edge 36 in the insulation 34 is left behind because the insulation 34 was not fully stripped. This defect 36 can make it difficult to properly insert the wire 12 fully into a contact.

SUMMARY

In view of the foregoing background, it is therefore an object of the present invention to provide a system and method for crimping and wire stripping to achieve a precise shape with crimping dies which move in two controlled directions.

In particular, the system for multi-stage crimping and wire stripping includes a first crimping die having a first portion of a selected shape defined therein, and a second crimping die having a complementary second portion of the selected shape defined therein. The system also includes the first and second crimping dies being operable to be displaced towards each other and along a first axis during a compression stroke. The first and second crimping dies are also operable to be displaced along a second axis during a closing stroke subsequent to the compression stroke, where the second axis is generally perpendicular to the first axis. In addition, the system includes the first and second crimping dies cooperating to crimp the contact into the selected shape to the wire upon completion of the closing stroke.

The system may also include the first portion of the selected shape being offset from the complementary second portion when the first and second crimping dies are in a home position. The first and second crimping dies may be operable to be displaced towards each other along the second axis during the closing stroke.

The selected shape may be one of circular, square, rectangular, hexagon, and "B" crimp, for example. The selected shape may also be compatible with non-insulated contacts.

In a particular aspect, the first and second crimping dies may each further comprise sharpened edges along the first portion of the first crimping die and along the complementary second portion of the second crimping die, where the sharpened edges are configured to slice through and strip insulation covering the wire. The wire may include a plurality of conductors.

In another particular aspect, the system may include a handle having the first and second crimping dies mounted thereon, where the handle may have first and second guideways for slidingly receiving the respective first and second crimping dies during the closing stroke. The first and second crimping dies may be operable to be displaced together in a same direction along the second axis into the respective first and second guideways during the closing stroke.

In a particular aspect, the first and second crimping dies are operable to be displaced during a compression stroke in a first motion to compress the contact into a preliminary shape and on to the wire. The first and second crimping dies are operable to be displaced during a closing stroke in a second motion subsequent to the compression stroke, where the first motion is different than the second motion. The first and second crimping dies cooperate to crimp the contact from its preliminary shape into the selected shape upon completion of the closing stroke.

In another particular aspect, a method is disclosed for multi-stage crimping of a contact to a wire using a first crimping die having a first portion of a selected shape defined therein and a second crimping die having a complementary second portion of the selected shape defined therein. The method includes displacing the first and second crimping dies towards each other and along a first axis during a compression stroke, and displacing the first and second crimping dies along a second axis during a closing stroke subsequent to the compression stroke. The second axis is generally perpendicular to the first axis. The method also includes completing the closing stroke to crimp the contact into the selected shape to the wire.

The method may also include slicing through insulation covering the wire using sharpened edges along the first portion of the first crimping die and along the complementary second portion of the second crimping die to strip insulation covering the wire.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. For example, the invention may be powered manually, electrically, pneumatically, or hydraulically. Rather, these embodiments are provided so that this disclosure will be thorough and complete, and will fully convey the scope of the invention to those skilled in the art. Like numbers refer to like elements throughout.

Referring now to FIGS. 4A-4F, a particular aspect of the multi-stage crimping system for creating circular crimps is illustrated. The crimping system includes a first crimping die 102a having a first portion 104a of a selected shape defined therein, and a second crimping die 102b having a complementary second portion 104b of the selected shape defined therein. In this particular aspect, the selected shape is circular.

Figure 4A:
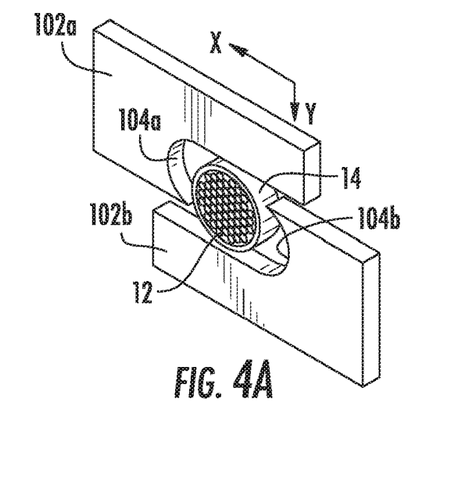
FIG. 4A is a perspective view of crimping system in a home position for creating a circular crimp in which various aspects of the disclosure may be implemented.
Figure 4B:
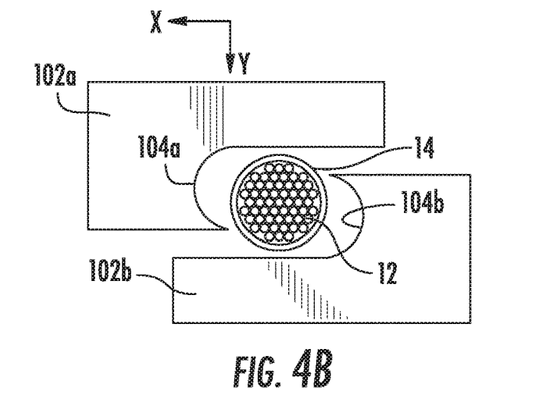
FIG. 4B is a front view of the crimping system of FIG. 4A.
Figure 4C:
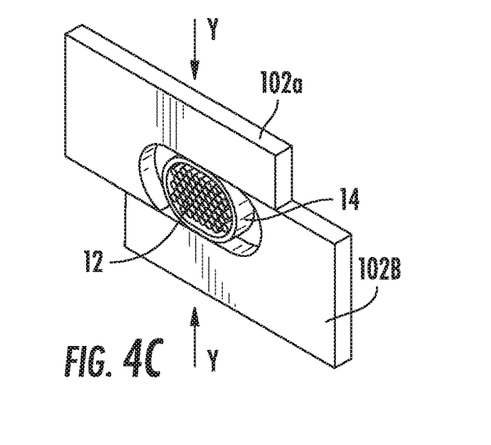
FIG. 4C is a perspective view of the crimping system displaced along a first axis.
Figure 4D:
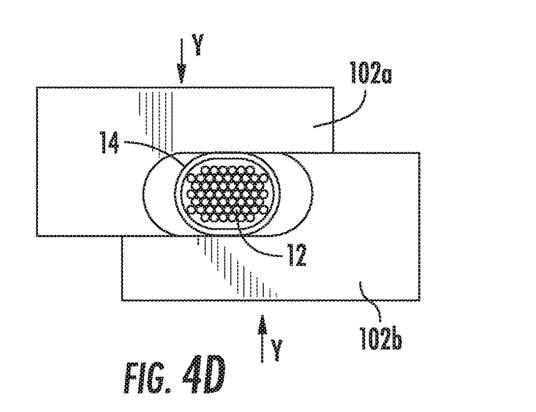
FIG. 4D is a front view of the crimping system of FIG. 4C.

Generally speaking, the first and second crimping dies 102a, 102b are operable to be displaced during a compression stroke in a first motion to compress the contact 14 into a preliminary shape and on to the wire 12 as shown in FIGS. 4C and 4D. The first and second crimping dies 102a, 102b are operable to be displaced during a closing stroke in a second motion subsequent to the compression stroke, where the first motion is different than the second motion. The first and second crimping dies 102a, 102b cooperate to crimp the contact 14 from its preliminary shape into the selected shape upon completion of the closing stroke as shown in FIGS. 4E and 4F.

More specifically, the first and second crimping dies 102a, 102b are operable to be displaced towards each other and along a first axis during a compression stroke. For example, the first axis may be in the "y" axis. The first and second crimping dies 102a, 102b are also operable to be displaced along a second axis during a closing stroke subsequent to the compression stroke, where the second axis is generally perpendicular to the first axis. The second axis may by the "x" axis. Accordingly, in FIGS. 4C and 4D, the first and second crimping dies 102a, 102b move towards each other along the "y" axis in order to compress the contact 14 into an oval shape during the compression stroke.

Figure 4E:
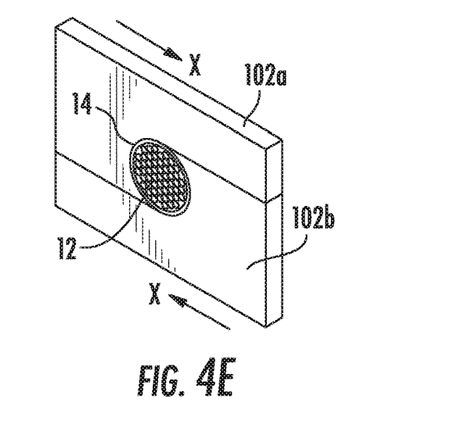
FIG. 4E is a perspective view of the crimping system displaced along a second axis to create the circular crimp.
Figure 4F:
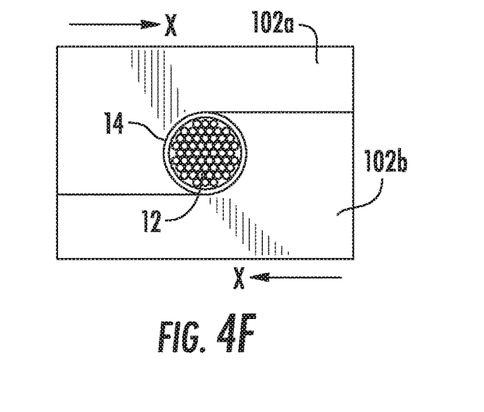
FIG. 4F is a front view of the crimping system of FIG. 4E.

The first and second crimping dies 102a, 102b subsequently are displaced along the "x" axis towards each other to crimp the contact 14 into the selected circular shape to the wire 12 upon completion of the closing stroke as shown in FIGS. 4E and 4F. There is no resulting defect from pinching the contact 14 together as described with reference to the prior art discussed above.

In a particular aspect, the first portion 104a of the selected shape (e.g. circular) is offset from the complementary second portion 104b when the first and second crimping dies are in a home position as shown in FIGS. 4A and 4B. Thus, the contact 14 is confined in the "x" plane and not the "y" plane so that the contact 14 can be deformed in to a preliminary shape. In FIGS. 4A-4F, the preliminary shape is an oval. However, in other aspects, the preliminary shape may be other than an oval.

Accordingly, for example, when the selected shape is square, rectangular, hexagon, and "B" crimp, the preliminary shape may or may not be an oval. The selected shape may also be compatible with non-insulated contacts.

Figure 5A:
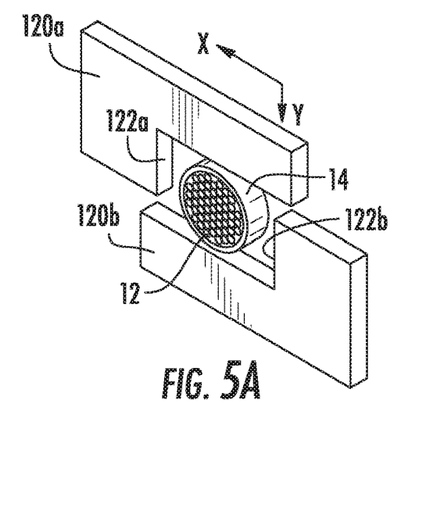
FIG. 5A is a perspective view of crimping system in a home position for creating a square crimp in which various aspects of the disclosure may be implemented.
Figure 5B:
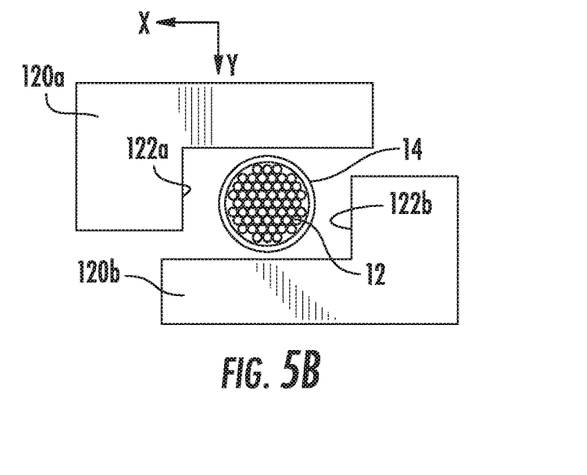
FIG. 5B is a front view of the crimping system of FIG. 5A.

Referring now to FIGS. 5A-5F, a square crimp is described. A first portion 122a of the square crimp is offset from a complementary second portion 122b when the first and second crimping dies 120a, 120b are in a home position as shown in FIGS. 5A and 5B. Similar to the circular crimp described above in FIGS. 4A-4F, the first and second crimping dies 120a, 120b are operable to be displaced towards each other and along "y" axis during the compression stroke. The first and second crimping dies 120a, 120b are operable to be displaced along the "x" axis during the closing stroke, which is subsequent to the compression stroke.

Figure 5C:
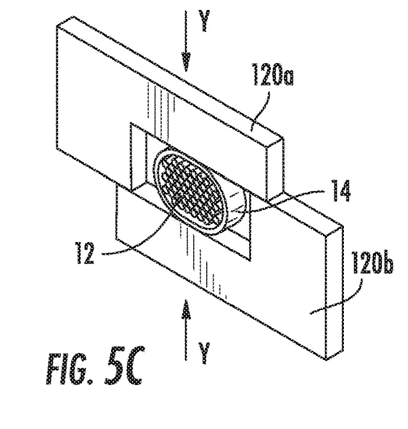
FIG. 5C is a perspective view of the crimping system displaced along a first axis.
Figure 5D:
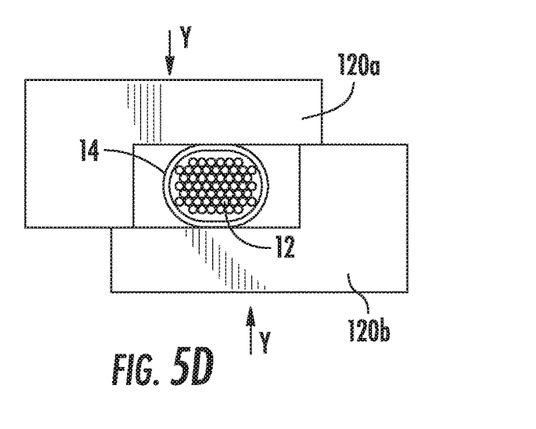
FIG. 5D is a front view of the crimping system of FIG. 5C.
Figure 5E:
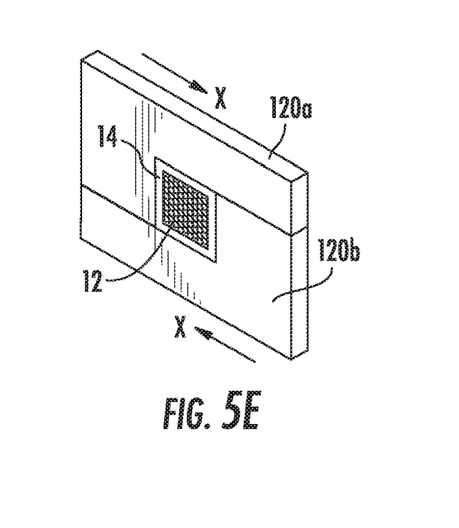
FIG. 5E is a perspective view of the crimping system displaced along a second axis to create the square crimp.
Figure 5F:
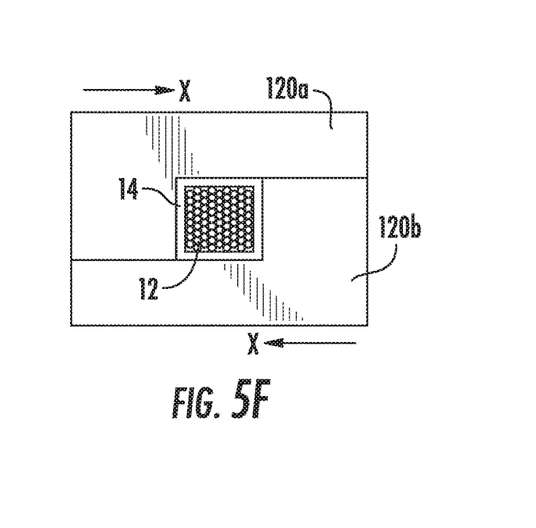
FIG. 5F is a front view of the crimping system of FIG. 5E.

Accordingly, in FIGS. 5C and 5D, the first and second crimping dies 120a, 120b move towards each other along the "y" axis in order to compress the contact 14 into an oval shape during the compression stroke. The first and second crimping dies 120a, 120b subsequently are displaced along the "x" axis towards each other to crimp the contact 14 into the hexagonal shape upon completion of the closing stroke as shown in FIGS. 5E and 5F.

Figure 6A:
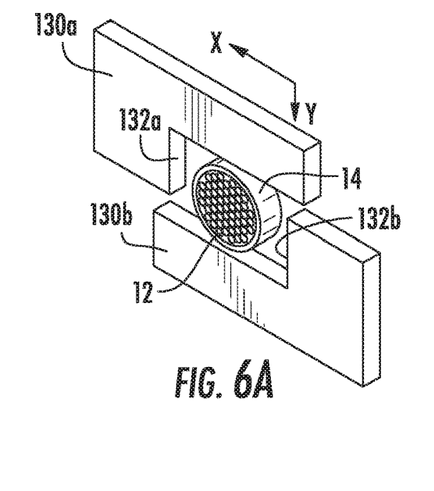
FIG. 6A is a perspective view of crimping system in a home position for creating a rectangular crimp in which various aspects of the disclosure may be implemented.
Figure 6B:
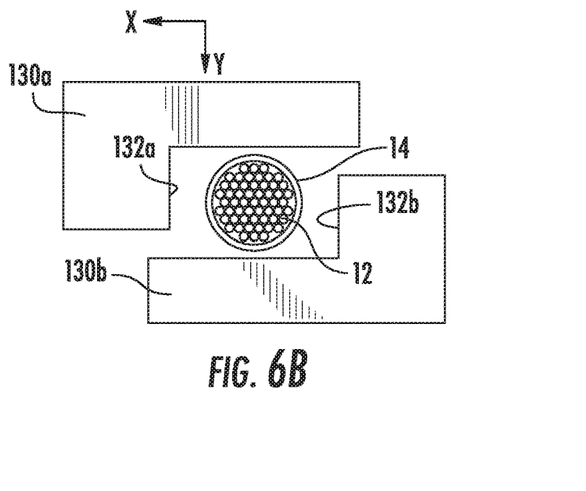
FIG. 6B is a front view of the crimping system of FIG. 6A.

FIGS. 6A-6F illustrate a rectangular crimp of the contact 14. A first portion 132a of the rectangular crimp is offset from a complementary second portion 132b when the first and second crimping dies 130a, 130b are in a home position as shown in FIGS. 6A and 6B. Similar to the square crimp described above in FIGS. 5A-5F, the first and second crimping dies 130a, 130b are operable to be displaced towards each other and along "y" axis during the compression stroke. The first and second crimping dies 130a, 130b are operable to be displaced along the "x" axis during the closing stroke, which is subsequent to the compression stroke.

Figure 6C:
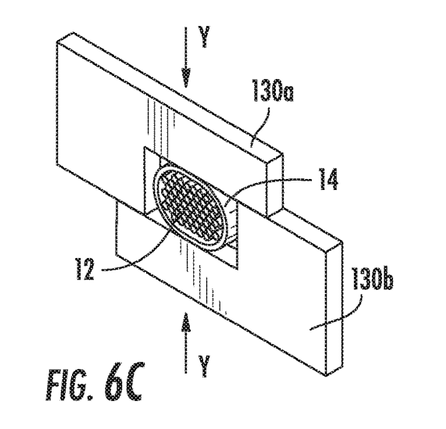
FIG. 6C is a perspective view of the crimping system displaced along a first axis.
Figure 6D:
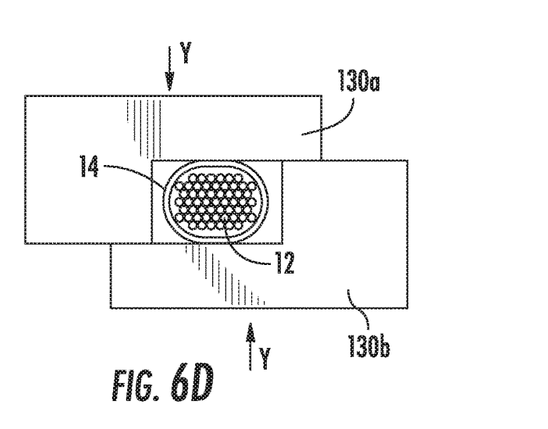
FIG. 6D is a front view of the crimping system of FIG. 6C.
Figure 6E:
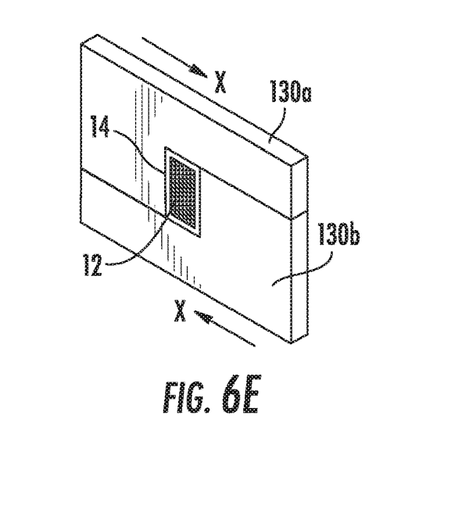
FIG. 6E is a perspective view of the crimping system displaced along a second axis to create the rectangular crimp.
Figure 6F:
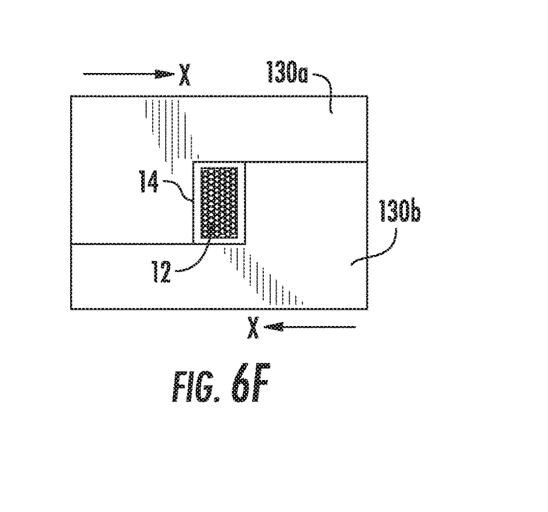
FIG. 6F is a front view of the crimping system of FIG. 6E.

The first and second crimping dies 130a, 130b move towards each other along the "y" axis as shown in FIGS. 6C and 6D to compress the contact 14 into an oval shape during the compression stroke. The first and second crimping dies 130a, 130b subsequently are displaced along the "x" axis towards each other to crimp the contact 14 into the rectangular shape upon completion of the closing stroke as shown in FIGS. 6E and 6F.

Figure 7A:
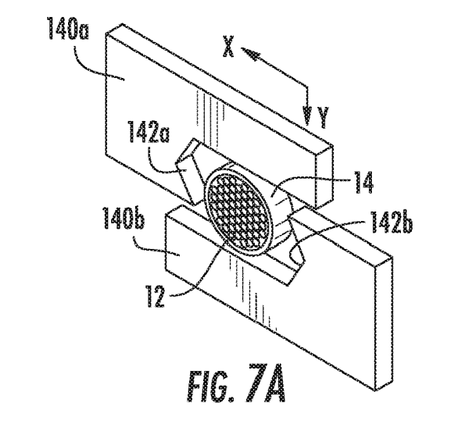
FIG. 7A is a perspective view of crimping system in a home position for creating a hexagonal crimp in which various aspects of the disclosure may be implemented.
Figure 7B:
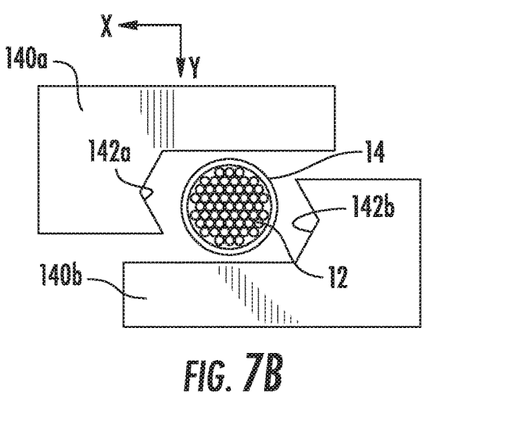
FIG. 7B is a front view of the crimping system of FIG. 7A.

Referring now to FIGS. 7A-7F, a hexagonal crimp of the contact 14 is shown. A first portion 142a of the hexagonal crimp is offset from a complementary second portion 142b when the first and second crimping dies 140a, 140b are in a home position as shown in FIGS. 7A and 7B. The contact 14 is initially a circular shape and placed between the first and second crimping dies 140a, 140b as shown in FIGS. 7A-7F. The first and second crimping dies 140a, 140b are operable to be displaced towards each other and along "y" axis during the compression stroke and are operable to be displaced along the "x" axis during the closing stroke, which is subsequent to the compression stroke.

Figure 7C:
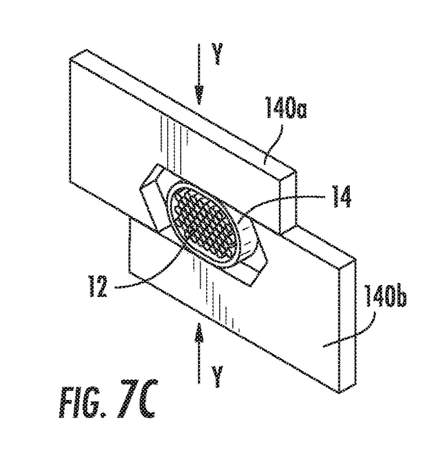
FIG. 7C is a perspective view of the crimping system displaced along a first axis.
Figure 7D:
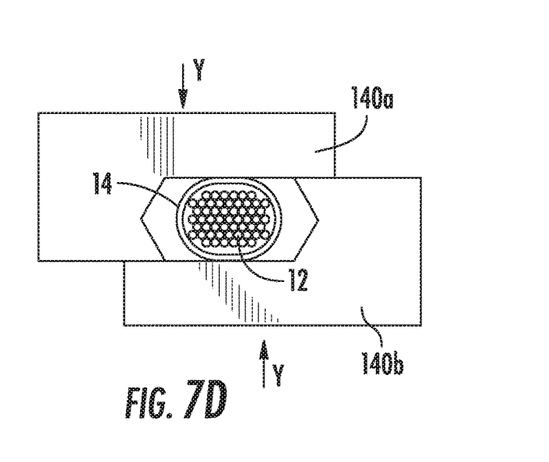
FIG. 7D is a front view of the crimping system of FIG. 7C.
Figure 7E:
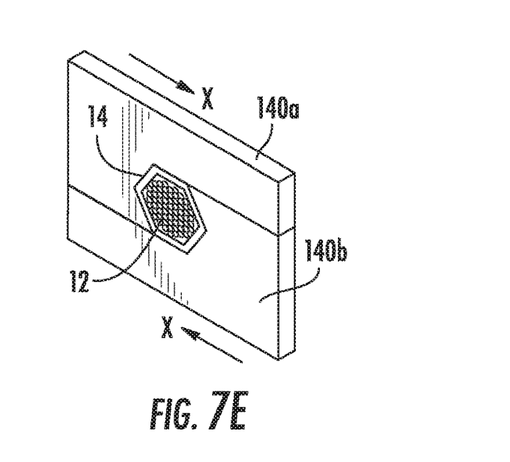
FIG. 7E is a perspective view of the crimping system displaced along a second axis to create the hexagonal crimp.
Figure 7F:
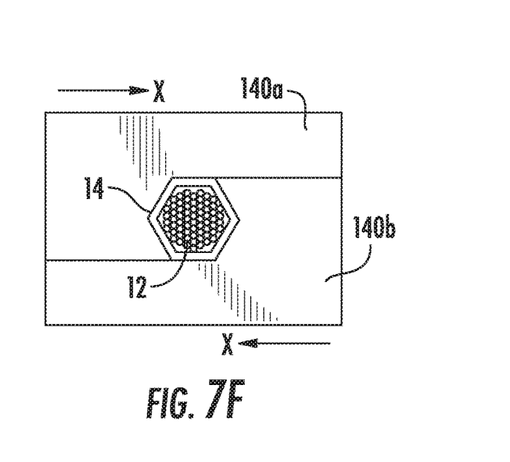
FIG. 7F is a front view of the crimping system of FIG. 7E.
Figure 8A:
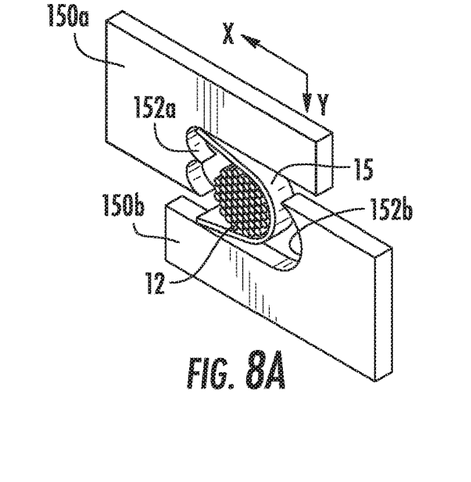
FIG. 8A is a perspective view of crimping system in a home position for creating a "B" crimp in which various aspects of the disclosure may be implemented.
Figure 8B:
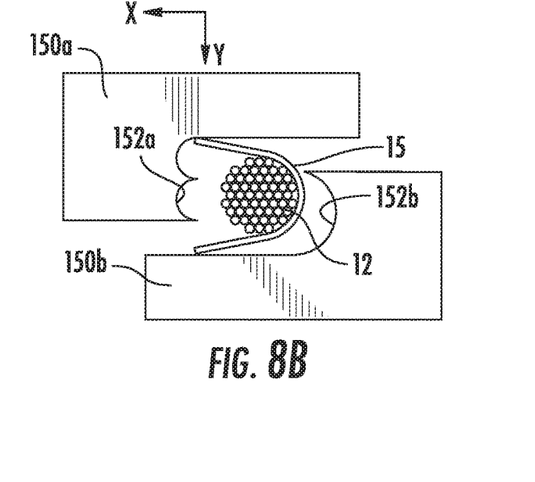
FIG. 8B is a front view of the crimping system of FIG. 8A.
Figure 8C:
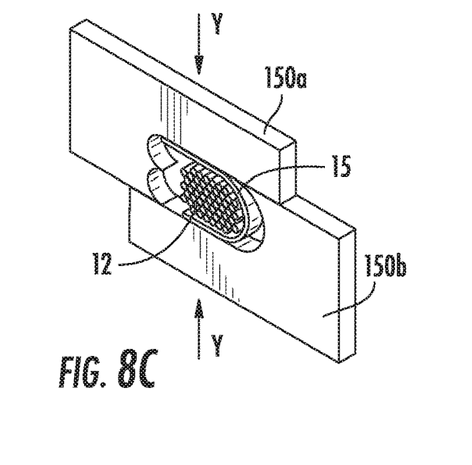
FIG. 8C is a perspective view of the crimping system displaced along a first axis.
Figure 8D:
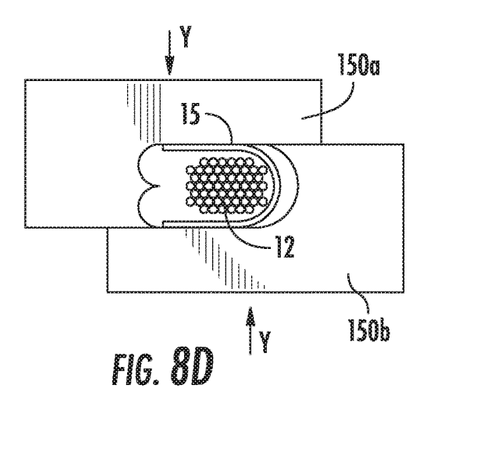
FIG. 8D is a front view of the crimping system of FIG. 8C.
Figure 8E:
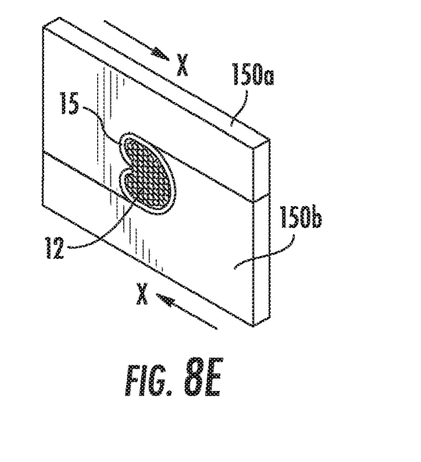
FIG. 8E is a perspective view of the crimping system displaced along a second axis to create the "B" crimp.
Figure 8F:
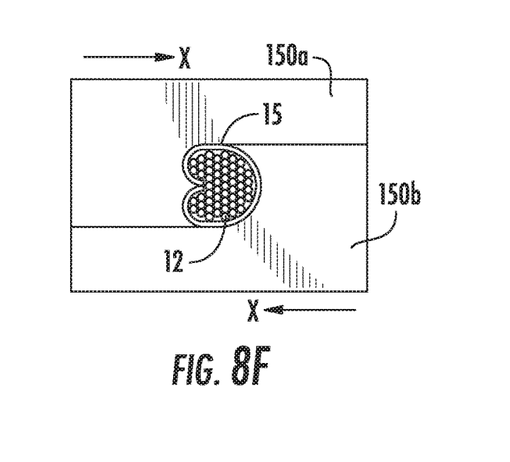
FIG. 8F is a front view of the crimping system of FIG. 8E.

The first and second crimping dies 140a, 140b move towards each other along the "y" axis as shown in FIGS. 7C and 7D to compress the contact 14 into an oval shape during the compression stroke. The first and second crimping dies 140a, 140b subsequently are displaced along the "x" axis towards each other to crimp the contact 14 into the hexagonal shape upon completion of the closing stroke as shown in FIGS. 7E and 7F. Referring now to FIGS. 8A-8F, a B-crimp of the contact 15 is shown. The contact 15 is initially an open shape and placed between the first and second crimping dies 150a, 150b as shown in FIGS. 7A-7F. A first portion 152a of the B-crimp is offset from a complementary second portion 152b when the first and second crimping dies 150a, 150b are in a home position as shown in FIGS. 8A and 8B. The first and second crimping dies 150a, 150b are operable to be displaced towards each other and along "y" axis during the compression stroke and are operable to be displaced along the "x" axis during the closing stroke, which is subsequent to the compression stroke. The first and second crimping dies 150a, 150b move towards each other along the "y" axis as shown in FIGS. 8C and 8D to compress the contact 15 into a curved shape during the compression stroke. The first and second crimping dies 150a, 150b subsequently are displaced along the "x" axis towards each other to crimp the contact 15 into the B-crimp upon completion of the closing stroke as shown in FIGS. 8E and 8F.

Figure 9A:
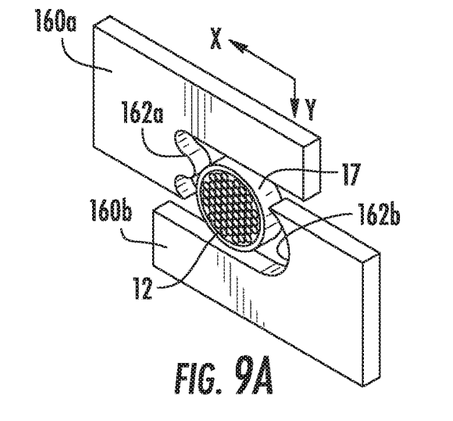
FIG. 9A is a perspective view of crimping system in a home position for creating a non-insulated crimp in which various aspects of the disclosure may be implemented.
Figure 9B:
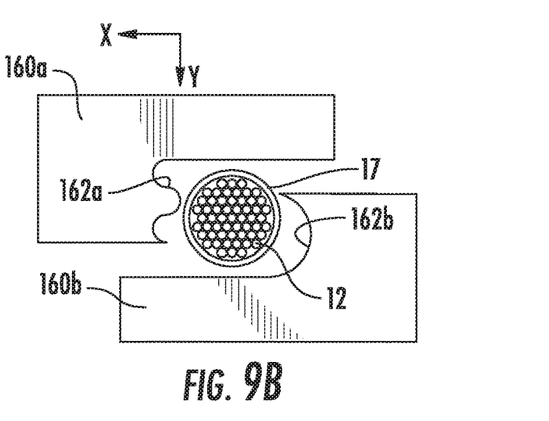
FIG. 9B is a front view of the crimping system of FIG. 9A.

Referring now to FIGS. 9A-9F, a non-insulated crimp of the contact 17 is shown. The contact 17 is placed between the first and second crimping dies 160a, 160b as shown in FIGS. 9A-9F. A first portion 162a of the first crimping die 160a is offset from a complementary second portion 162b when the first and second crimping dies 160a, 160b are in a home position as shown in FIGS. 9A and 9B. The first and second crimping dies 160a, 160b are operable to be displaced towards each other and along "y" axis during the compression stroke and are operable to be displaced along the "x" axis during the closing stroke, which is subsequent to the compression stroke.

Figure 9C:
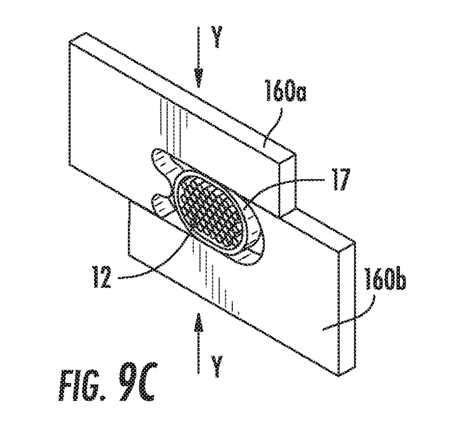
FIG. 9C is a perspective view of the crimping system displaced along a first axis.
Figure 9D:
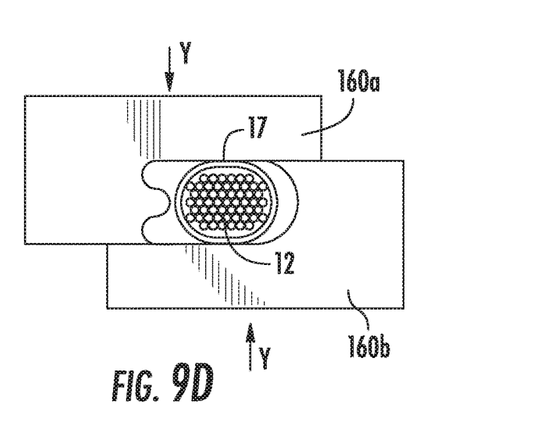
FIG. 9D is a front view of the crimping system of FIG. 9C.
Figure 9E:
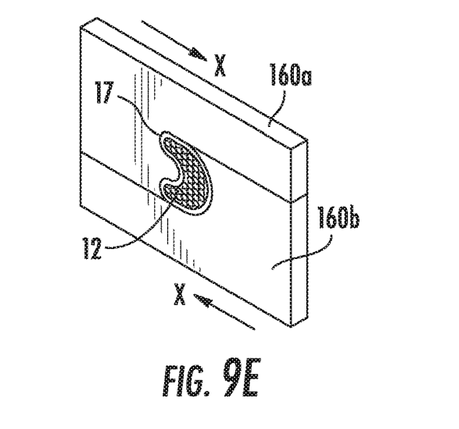
FIG. 9E is a perspective view of the crimping system displaced along a second axis to create the non-insulated crimp.
Figure 9F:
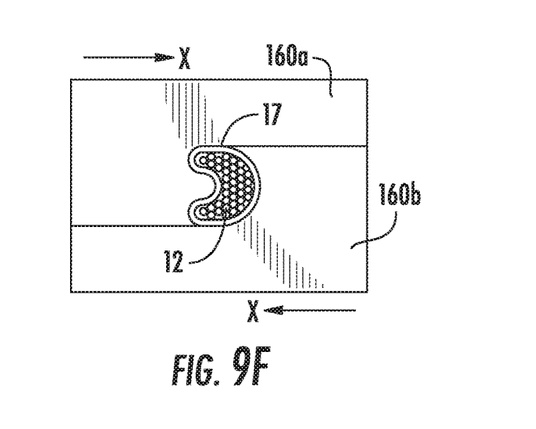
FIG. 9F is a front view of the crimping system of FIG. 9E.

The first and second crimping dies 160a, 160b move towards each other along the "y" axis as shown in FIGS. 9C and 9D to compress the contact 17 during the compression stroke. The first and second crimping dies 160a, 160b subsequently are displaced along the "x" axis towards each other to crimp the contact 17 upon completion of the closing stroke as shown in FIGS. 9E and 9F.

Figure 10A:
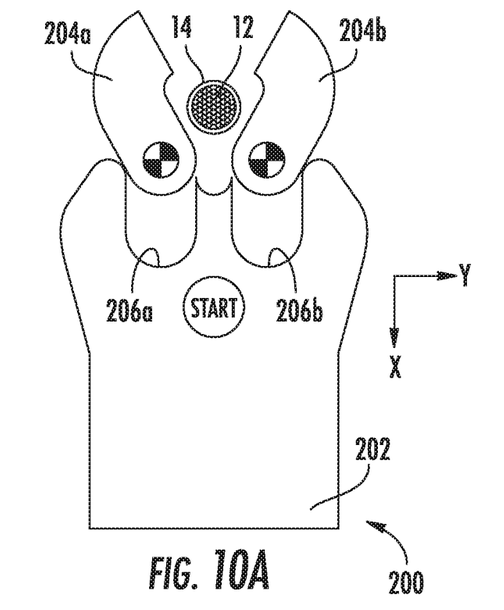
FIG. 10A is a front view of a crimping system having a handle in which various aspects of the disclosure may be implemented.
Figure 10B:
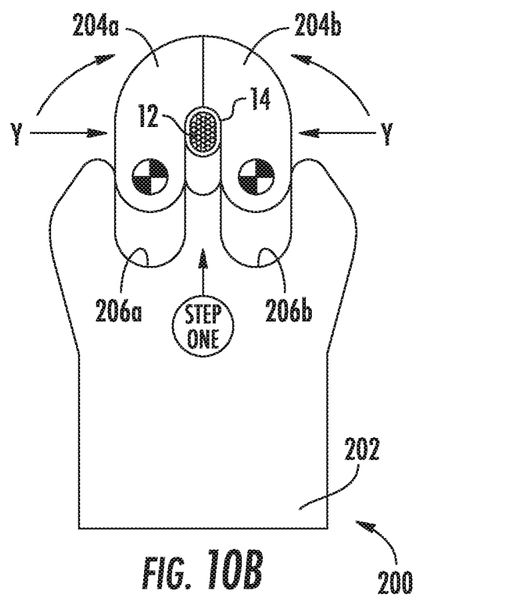
FIG. 10B is a front view of the crimping system of FIG. 10A displaced along a first axis.
Figure 10C:
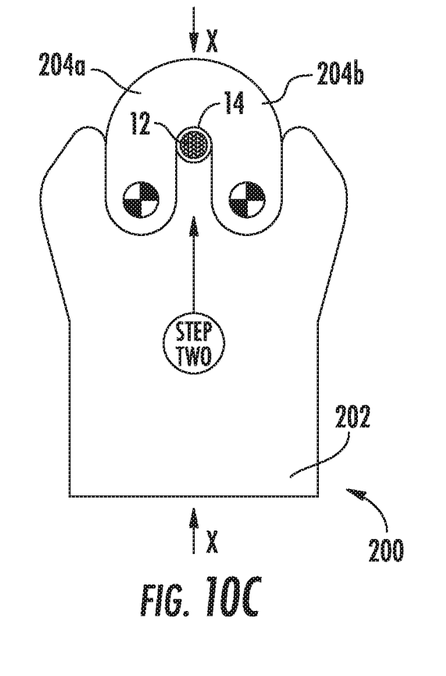
FIG. 10C is a front view of the crimping system of FIG. 10A displaced along a second axis to create the circular crimp.
Figure 10D:
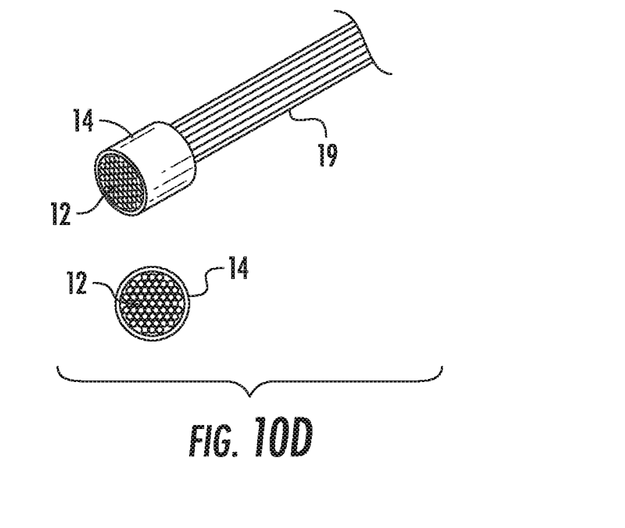
FIG. 10D is a detail view of a resulting crimp of the crimping system of FIG. 10A.

Referring now to FIGS. 10A-10C, in a particular aspect a crimping system 200 may include a handle 202 having first and second crimping dies 204a, 204b mounted thereon. The handle 202 may have first and second guideways 206a, 206b for slidingly receiving the respective first and second crimping dies 204a, 204b during the closing stroke. The first and second crimping dies 204a, 204b are operable to be displaced towards each other during the compression stroke and to be displaced together in a same direction along into the respective first and second guideways 206a, 206b during the closing stroke. The finished crimp is shown in FIG. 10D. The system 200 may be a hand tool or a pneumatic tool.

Figure 11A:
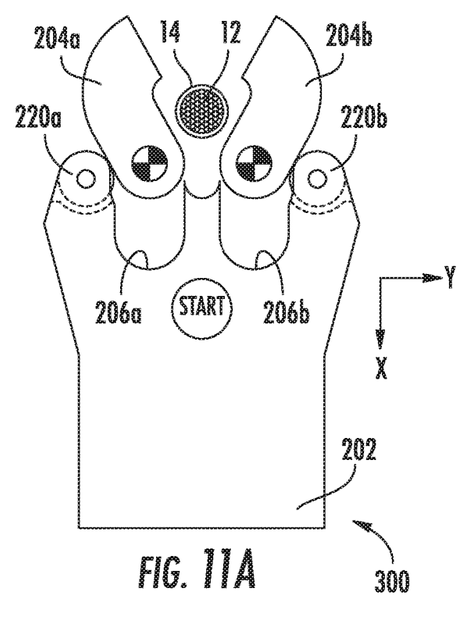
FIG. 11A is a front view of a crimping system having a handle in which various aspects of the disclosure may be implemented.
Figure 11B:
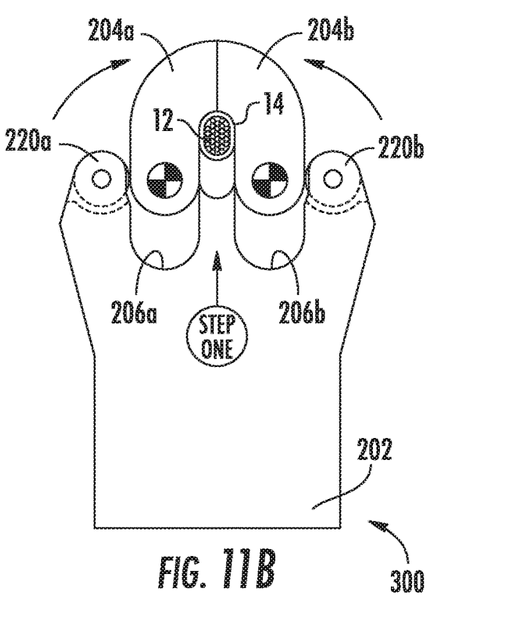
FIG. 11B is a front view of the crimping system of FIG. 11A displaced along a first axis.
Figure 11C:
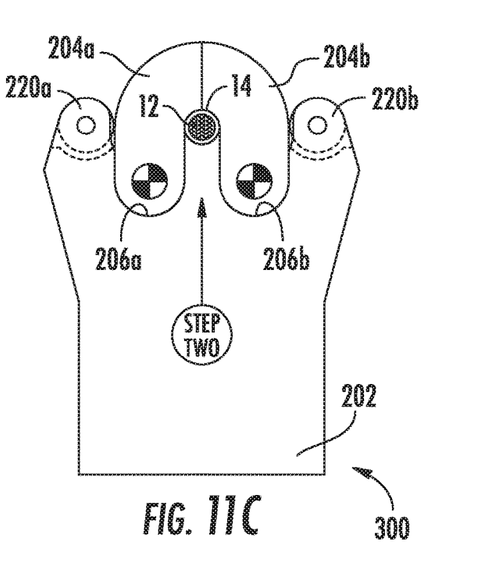
FIG. 11C is a front view of the crimping system of FIG. 11A displaced along a second axis to create the circular crimp.
Figure 11D:
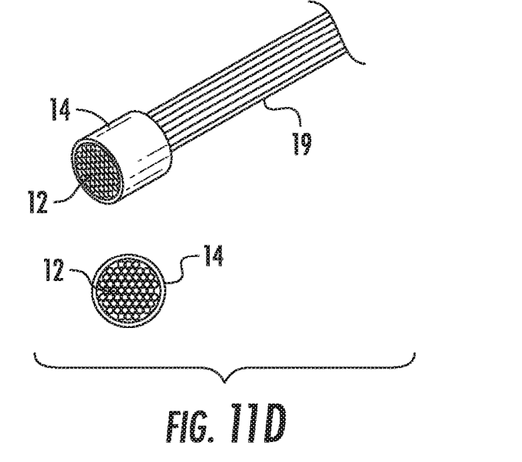
FIG. 11D is a detail view of a resulting crimp of the crimping system of FIG. 11A.
Figure 12A:
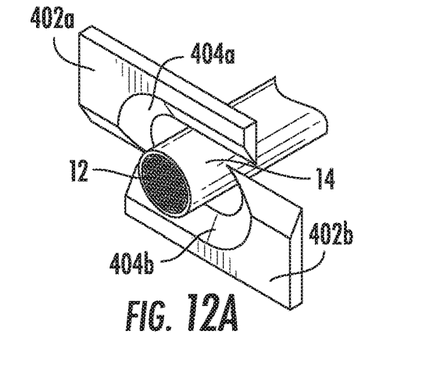
FIG. 12A is a perspective view of a wire stripping aspect of the system and in which various aspects of the disclosure may be implemented.
Figure 12B:
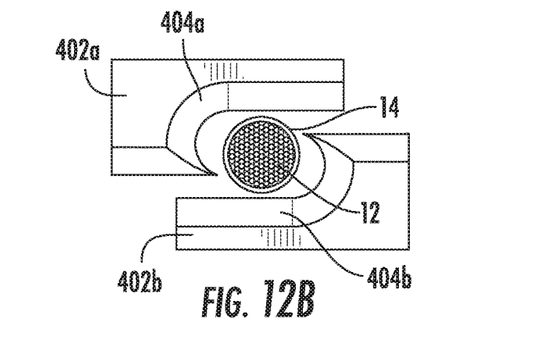
FIG. 12B is a front view of the wire stripping aspect of the system of FIG. 12A.
Figure 12C:
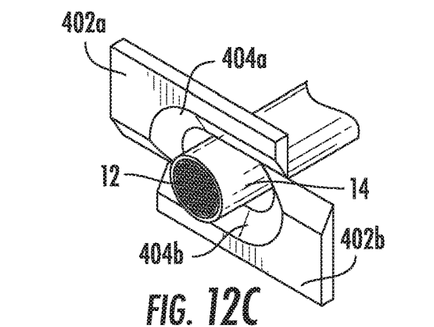
FIG. 12C is a perspective view of the wire stripping aspect of the system displaced along a first axis.
Figure 12D:
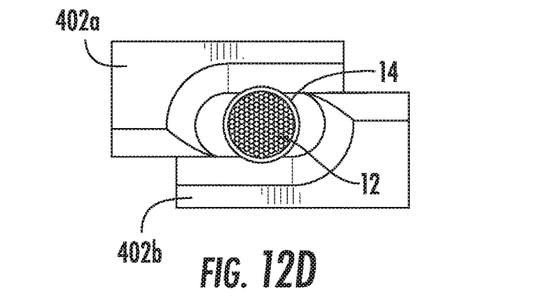
FIG. 12D is a front view of the wire stripping aspect of the system of FIG. 12C.
Figure 12E:
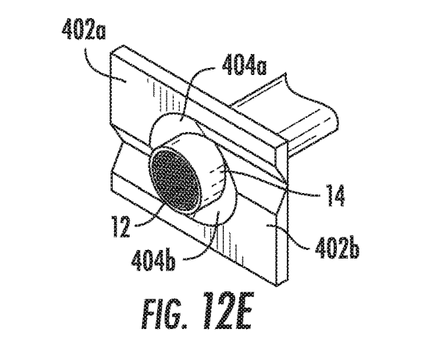
FIG. 12E is a perspective view of the wire stripping aspect of the system displaced along a second axis to strip the insulation.
Figure 12F:
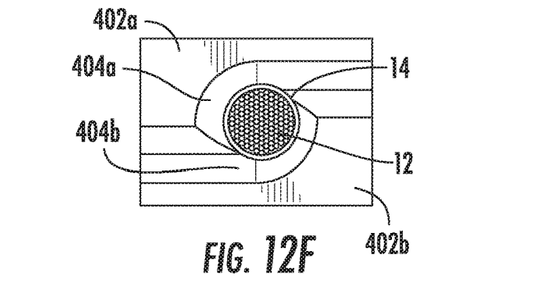
FIG. 12F is a front view of the wire stripping aspect of the system of FIG. 12E.
Figure 12G:
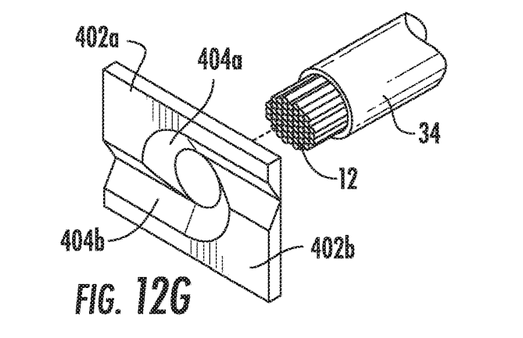
FIG. 12G is a perspective view of the wire stripping aspect of the system with the insulation stripped.
Figure 12H:
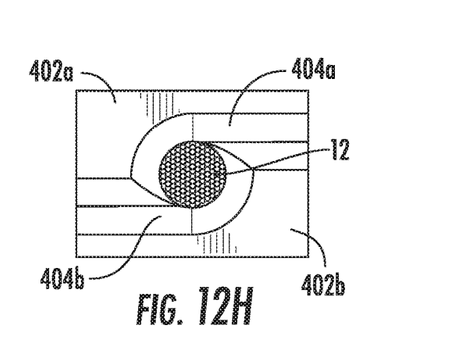
FIG. 12H is a front view of the wire stripping aspect of the system of FIG. 12G with the insulation stripped.

Referring now to FIGS. 11A-11C, an aspect of a crimping system 300 may also include a drive mechanism, such as rollers 220a, 220b in order to drive the compression and/or closing strokes of the system 300. Similar to FIG. 10D described above, the finished crimp is shown in FIG. 11D. The system 300 may be a hand tool or a pneumatic tool. As those of ordinary skill in the art can appreciate, the first and second crimping dies described above with respect to FIGS. 4-10 may be manually operated, pneumatically, electrically, or hydraulically driven, for example.

Referring now to FIGS. 12A-12H, the first and second crimping dies 402a, 402b may each further comprise sharpened edges along the first portion 404a of the first crimping die 402a and along the complementary second portion 404b of the second crimping die 402b. The sharpened edges are configured to slice through and strip insulation 34 covering the wire 12.

The wire 12 may include a plurality of conductors and the insulation 34 may be exceptionally thin. As a non-limiting example, in some high-performance wiring there is an insulation layer 34 closest to the metal conductor that may be in the range of 0.001 or 0.002 in thickness. If the wire stripper used to remove insulation from such conductors is not perfectly matched to the diameter of the wire, the stripper may remove the outer insulation covering without removing its inner film layer over the conductors. The particular movement of the crimping dies 402a, 402b, and the respective sharpened edges along the first portion 404a and along the complementary second portion 404b may create a sawing action along at least a portion of the sides of the insulation 34 so that that action would promote cutting through the very thin film formed on the conductor 12.

Figure 13:
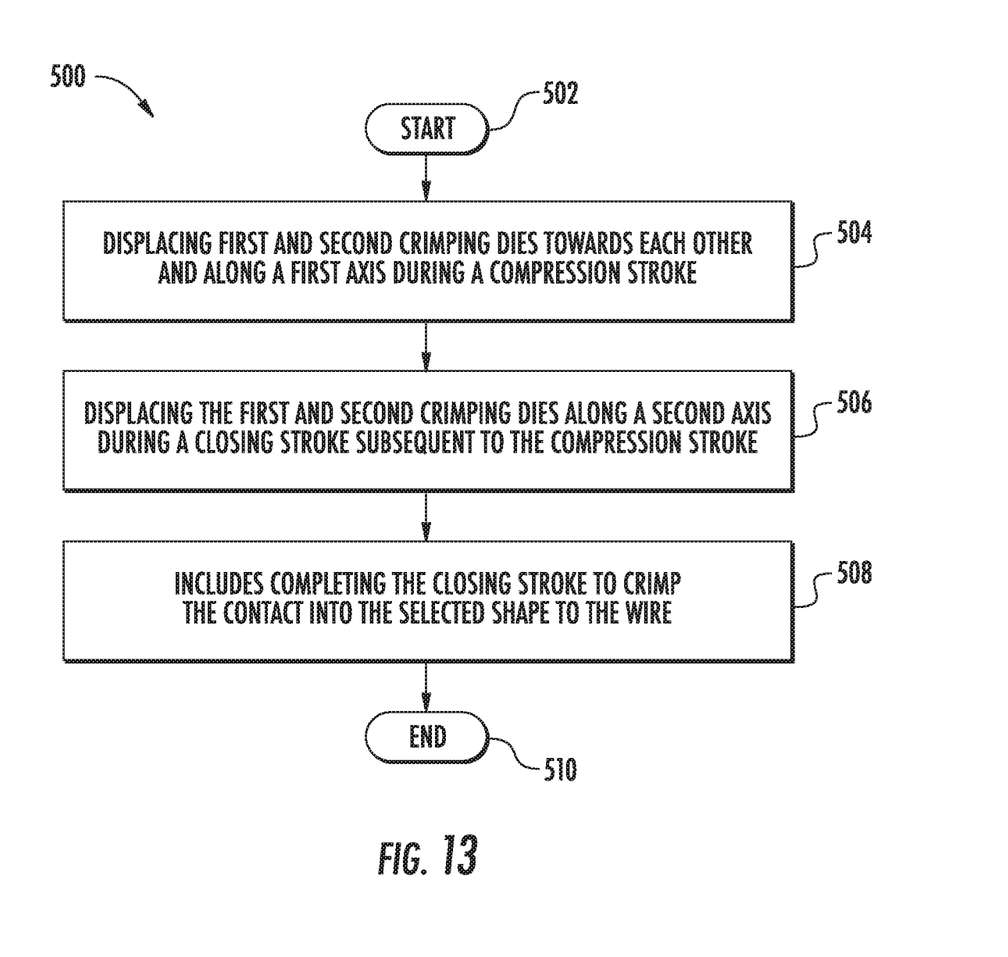
FIG. 13 is a flow diagram of a method of multi-stage crimping and wire stripping.

Referring now to FIG. 13, in another particular aspect, a method 500 is disclosed for multi-stage crimping of a contact to a wire using a first crimping die having a first portion of a selected shape defined therein and a second crimping die having a complementary second portion of the selected shape defined therein. The method begins, at 502, and includes displacing the first and second crimping dies towards each other and along a first axis during a compression stroke, at 504. Moving to 506, the method includes displacing the first and second crimping dies along a second axis during a closing stroke subsequent to the compression stroke. The second axis is generally perpendicular to the first axis.

In addition, the method includes, at 508, completing the closing stroke to crimp the contact into the selected shape to the wire. The method may also include slicing through insulation covering the wire using sharpened edges along the first portion of the first crimping die and along the complementary second portion of the second crimping die to strip insulation covering the wire. The method ends at 510.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for multi-stage crimping of a contact to a wire, the system comprising:
a first crimping die having a first portion of a selected shape defined therein;
a second crimping die having a complementary second portion of the selected shape defined therein, wherein the first portion of the selected shape comprises one half of the selected shape and the second portion of the selected shape comprises the other half of the selected shape;

the first and second crimping dies configured to be displaced towards each other and along a first axis during a compression stroke to compress the contact to the wire;

the first and second crimping dies configured to be displaced along a second axis during a closing stroke subsequent to the compression stroke, the second axis generally perpendicular to the first axis; and the first and second crimping dies cooperating to crimp the contact into the selected shape to the wire upon completion of the closing stroke.

2. The system of claim 1, the first portion of the selected shape being offset from the complementary second portion when the first and second crimping dies are in a home position before the compression stroke.

3. The system of claim 1, the first and second crimping dies configured to be displaced towards each other along the second axis during the closing stroke.

4. The system of claim 1, wherein the selected shape is one of circular, square, rectangular, and hexagon.

5. The system of claim 1, wherein the selected shape is a "B" crimp.

6. The system of claim 1, wherein the selected shape is compatible with non-insulated contacts.

7. The system of claim 1, wherein the first and second crimping dies each further comprise sharpened edges along the first portion of the first crimping die and along the complementary second portion of the second crimping die, the sharpened edges configured to slice through and strip insulation covering the wire.

8. The system of claim 1, wherein the system is compatible for the wire comprising a plurality of conductors.

9. The system of claim 1, further comprising a handle having the first and second crimping dies mounted thereon.

10. The system of claim 9, the handle having first and second guideways for slidingly receiving the respective first and second crimping dies during the closing stroke.

11. The system of claim 10, the first and second crimping dies operable to be displaced together in a same direction along the second axis into the respective first and second guideways during the closing stroke.

12. A system for multi-stage crimping of a contact to a wire, the system comprising:

a first crimping die having a first portion of a selected shape defined therein;

a second crimping die having a complementary second portion of the selected shape defined therein, wherein the first portion of the selected shape comprises one half the selected shape and the second portion of the selected shape comprises the other half of the selected shape;

the first and second crimping dies configured to be displaced during a compression stroke in a first motion to compress the contact into a preliminary shape and on to the wire;

the first and second crimping dies configured to be displaced during a closing stroke in a second motion subsequent to the compression stroke, the first motion being in a different direction than the second motion; and the first and second crimping dies cooperating to crimp the contact from its preliminary shape into the selected shape to the wire upon completion of the closing stroke.

13. The system of claim 12, the first portion of the selected shape being offset from the complementary second portion when the first and second crimping dies are in a home position before the compression stroke.

14. The system of claim 12, the first and second crimping dies configured to be displaced towards each other during the closing stroke.

15. The system of claim 12, wherein the selected shape is one of circular, square, rectangular, and hexagon.

16. The system of claim 12, wherein the selected shape is a "B" crimp.

17. The system of claim 12, wherein the selected shape is compatible with non-insulated contacts.

18. The system of claim 12, further comprising:

a handle having the first and second crimping dies mounted thereon; and first and second guideways on the handle for slidingly receiving the respective first and second crimping dies during the closing stroke;

wherein the first and second crimping dies are configured to be displaced together in a same direction along the second axis into the respective first and second guideways during the closing stroke.

19. A method for multi-stage crimping of a contact to a wire using a first crimping die having a first portion of a selected shape defined therein and a second crimping die having a complementary second portion of the selected shape defined therein, wherein the first portion of the selected shape comprises one half the selected shape and the second portion of the selected shape comprises the other half of the selected shape, the method comprising:

displacing the first and second crimping dies towards each other and along a first axis during a compression stroke to compress the contact to the wire;

displacing the first and second crimping dies along a second axis during a closing stroke subsequent to the compression stroke, the second axis generally perpendicular to the first axis; and completing the closing stroke to crimp the contact into the selected shape to the wire.

20. The method of claim 19, further comprising slicing through insulation covering the wire using sharpened edges along the first portion of the first crimping die and along the complementary second portion of the second crimping die to strip insulation covering the wire.

* * * * *